United States Patent [19]

Bragole

[11] Patent Number: 4,859,540

[45] Date of Patent: Aug. 22, 1989

[54] METHOD FOR BONDING ADHESIVES TO POLYOLEFIN SURFACES AND THE LAMINATE FORMED THEREBY

[75] Inventor: Robert A. Bragole, Danvers, Mass.

[73] Assignee: Worthen Industries, Inc., Nashua, N.H.

[21] Appl. No.: 141,025

[22] Filed: Jan. 19, 1988

Related U.S. Application Data

[63] Continuation-in-part of Ser. No. 6,368, Jan. 23, 1987, Pat. No. 4,778,724.

[51] Int. Cl.⁴ ............................................ B32B 27/30
[52] U.S. Cl. .................................. 428/522; 428/518; 428/421
[58] Field of Search .................... 428/414, 520, 424.8, 428/423.1, 518; 427/54.1; 430/532

[56] References Cited

U.S. PATENT DOCUMENTS

| | | | |
|---|---|---|---|
| 3,036,930 | 5/1962 | Grimminger et al. | 428/414 |
| 3,892,575 | 7/1975 | Watts et al. | 430/532 |
| 4,303,697 | 12/1981 | Baseden | 428/520 |
| 4,778,724 | 10/1988 | Bragole | 428/414 |

*Primary Examiner*—Edith Buffalow
*Attorney, Agent, or Firm*—Samuels, Gauthier, Stevens & Kehoe

[57] ABSTRACT

Chlorinated polyolefins or other halogen containing products alone or in admixture with one another, are coated as primers on a solid or foamed polyolefin surface. The composition or chemical structure of the primer or primer blend is a significant aspect of the invention to achieve the most desirable results. The primed surface is irradiated and an adhesive bonded to the primer. The irradiated primer is more securely fastened to both the polyolefin surface and adhesive.

5 Claims, 1 Drawing Sheet

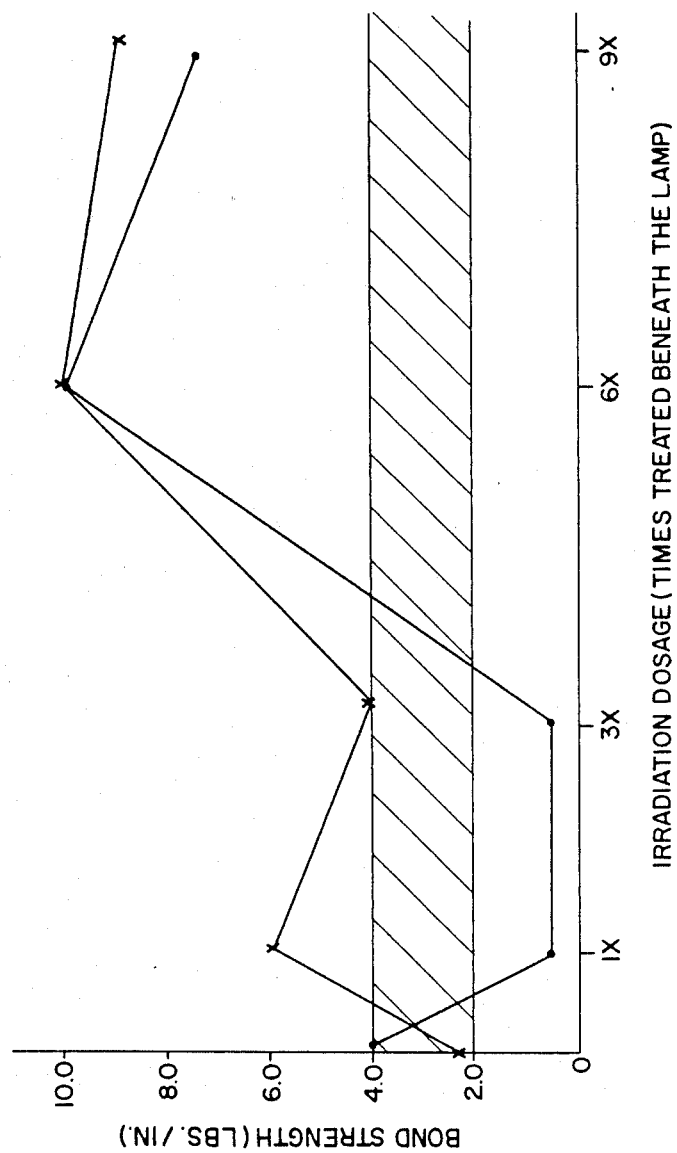

METHOD FOR BONDING ADHESIVES TO POLYOLEFIN SURFACES AND THE LAMINATE FORMED THEREBY

CROSS REFERENCE TO RELATED APPLICATIONS

This application is a continuation-in-part application of U.S. Ser. No. 6,368 filed Jan. 23, 1987, now U.S. Pat. No. 4,778,724.

BACKGROUND AND SUMMARY OF THE INVENTION

There have been several primers and processes developed over the years to improve the adhesion of materials to polypropylene and other polyolefins. Polyolefins are generally inert, paraffin-like polymeric substrates which are non-polar and very difficult to paint, coat or bond. They are further characterized as having low critical surface tensions of wetting, e.g., 35 dynes/cm or less which make them difficult to wet with paints, coatings and adhesives. Some of the processes developed to date to enhance the adhesion to polyolefins are flame treatment, corona discharge treatment, photo sensitized ultraviolet irradition, gas plasma treatment, acid etching, electron beam irradition and perhaps others. These processes generally enhance adhesion by either increasing wetting via oxidation (increase the critical surface tension of wetting), by cross-linking to increase surface mechanical strength, by increase in surface porosity to increase mechanical bonding by diffusion, by general surface cleaning or by combinations of these effects.

Primers have been developed for increasing adhesion to polyolefins and are generally non-polar or polar/-non-polar in nature to help provide a "bridge" between the substrate (the polyolefin) and the adhesive, coating or paint. Paints, coatings and adhesives are not necessarily always polar, but generally are, and the polar/-non-polar primer has both an affinity for the non-polar substrate and the polar paint, coating or adhesive.

The patents of Bragole U.S. Pat. Nos. 3,600,389; 3,607,536; 3,619,246; 3,627,609; 3,892,885; 4,321,307; and 4,764,370 teach various manifestations of photosensitized irradiation techniques to enhance bonding to polyolefin substrates. Such manifestations include the use of isocyanates or silanes or magnesium reacted phenolic resins with photosensitized ultraviolet irradiation. Other manifestations include the presence of isocyanate at the time of photosensitized ultraviolet irradiation while others use photosensitized irradition in combination with reactive products such as those containing isocyanates, acrylic monomers or epoxies. Some of the current techniques, while effective for some applications, produce surface changes which are not permanent. Others suffer from the fact that large quantities of hazardous waste have to be removed which is very expensive. Others suffer from universality and some are too expensive to have had widespread use.

The primers appear to be more effective with paints and coatings than with adhesives. While the primer adheres well to the polyolefin it frequently suffers from inadequate adhesion to the adhesive.

I have now found that irradiation of these primers not only improves their subsequent adhesion to adhesives but also improves the adhesion of the primer to the substrate, e.g. the polyolefin surface.

It is believed the primer becomes engrafted to the polyolefin substrate surface and cross-links during continual exposure to irradiation. That is, it has been found that multiple exposure to relatively low radiation produces superior bonding results when compared to single or a few exposures to relatively high radiation, the relatively high radiation being substantially the value of the total amount of low radiation exposure. The net effect is (1) a stronger union of the primer to the polyolefin surface than is possible without irradiation (2) an insolubilizing of the primer making it more resistant to heat and chemical attack and (3) the previously disclosed improved adhesion of the engrafted primer to adhesives. While the alteration of the primer can accommodate and interact with the active ingredients (curative) of the two-part adhesives, I have found that the irradiated primer surface is active enough to accommodate one-part adhesives as well, such as one-part polyurethanes and neoprenes adhesives. In addition to chlorinated polypropylene primers, others I have found that other primer types such as varying molecular weight terpolymers of vinyl chloride, vinyl acetate, and maleic acid are also useful as primers, after irradiation, alone or in admixture with the chlorinated polypropylene primers.

It appears that primers with certain characteristics are required to be effective in the primer irradiation process and these characteristics are at least the structure and molecular weight of the primer. For example, the percent halogen; i.e. chlorine, should range between 5 to 50% by weight and have a number dosage molecular weight of about 5,000 to 100,000. Further, it appears the higher the molecular weight, the more effective the primer is. Lastly, exposure to successive low dosages of radiation rather than a single or few doses at a level which would be equal to the columlative exposure of the relative low dosages is a further characteristic. The presence of some hydrogen on carbon atoms adjacent to carbon atoms bearing a halogen(s) also appear to be important factors. It is believed that the irradiated primer system will work on all substrates, including polyolefins, which have at least one hydrogen atom in a repeating unit of structure within the polymer.

BRIEF DESCRIPTION OF THE DRAWING

The drawing is a chart illustrating the bonding results achieved with the process of the invention.

DESCRIPTION OF THE PREFERRED EMBQDIMENT

The structures shown below illustrate, but are not limited to, the type of structures that are preferred for the primer and

PRIMER STRUCTURE

X = Halogen, e.g. chloro, bromo, fluoro; straight chained hydrocarbons, e.g. Methyl, Ethyl, Propyl etc., Acid, e.g. Maleic Acid, etc. and preferably X =

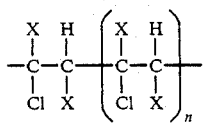

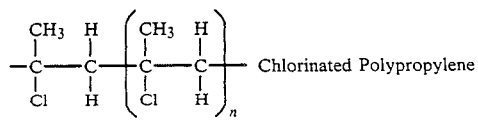 Chlorinated Polypropylene

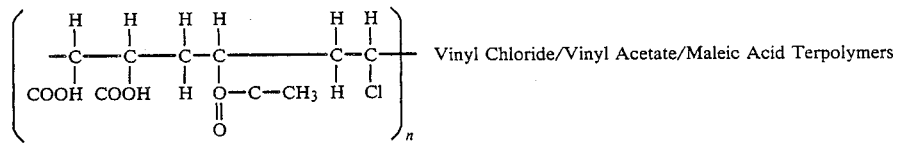 Vinyl Chloride/Vinyl Acetate/Maleic Acid Terpolymers

SURFACE STRUCTURE
X = Halogen, e.g. chloro, bromo, fluoro; straight chained hydrocarbons, e.g. Methyl, Ethyl, Propyl etc., Acid, e.g. Maleic Acid, etc. and preferrably X =

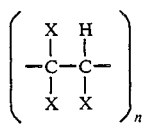

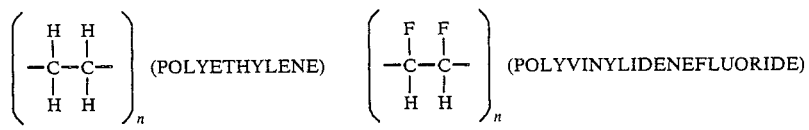

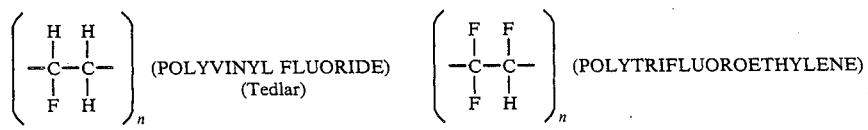

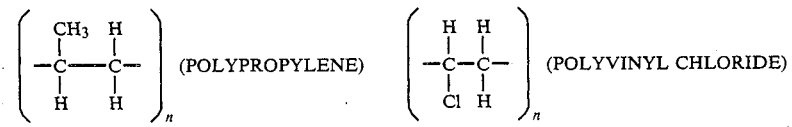

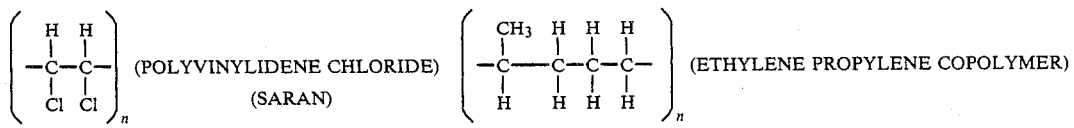

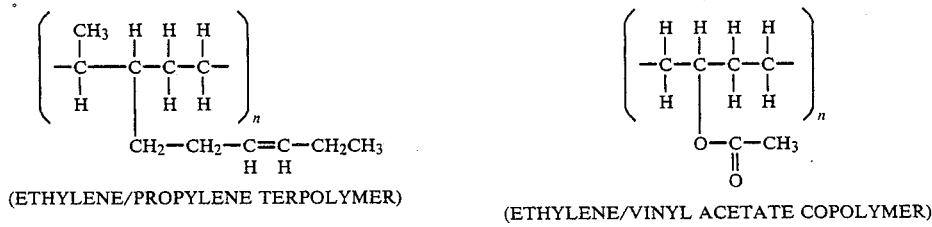

(ETHYLENE/PROPYLENE TERPOLYMER)     (ETHYLENE/VINYL ACETATE COPOLYMER)

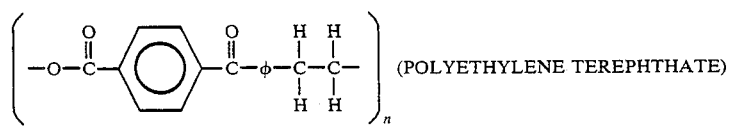 (POLYETHYLENE TEREPHTHATE)

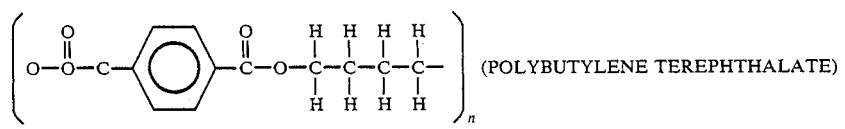 (POLYBUTYLENE TEREPHTHALATE)

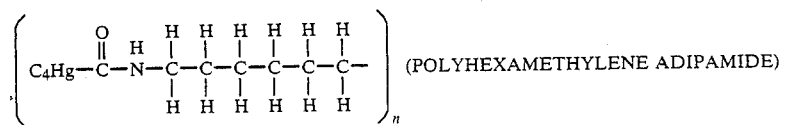
(POLYHEXAMETHYLENE ADIPAMIDE)

The primer structure provides a composition which allows the primer to be more securely fastened to the surface, allows for the strengthening of the primer to substrate bond through irradiative cross-linking and provides a subsequent (primer) surface for bonding coatings such as one- or two-part adhesives.

A commercially available chorinated polypropylene primer, which has excellent adhesion to polypropylene (polyolefin surface) is used in the equations which follows:

The reactions of the primer and substrate structures and believed to be occurring during the irradiation event.

CHART

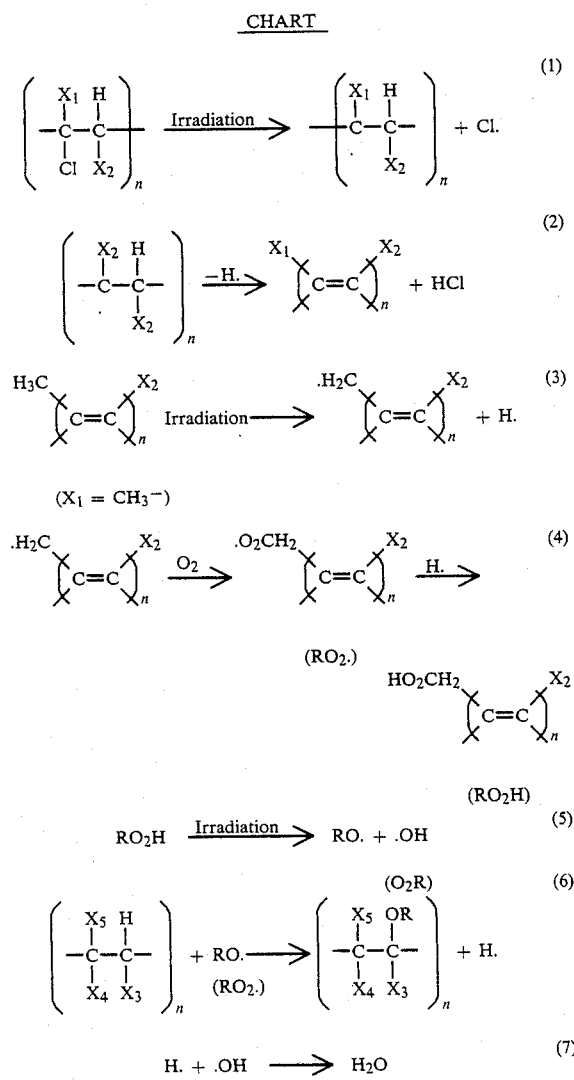

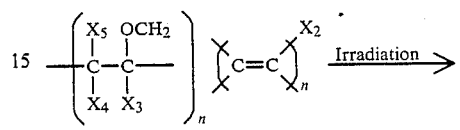

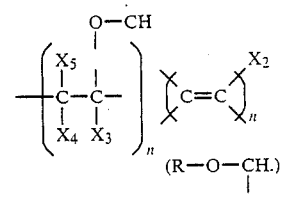

$ROCH. + ROCH. \longrightarrow ROCH-CH-OR$ (9)

The equations above are believed to be occuring on the primer surface during and subsequent to the irradiative event. They should, however, not be considered limitations for what is a novel technique for primer modification that increases adhesion to adhesives dramatically.

Equations (1) and (2) show the formation of some unsaturation within the primer structure during irradiation. There is a strong thermodynamic driving force for reactions (1) and (2) because structures with more energy values are generated. For example, if more energy is required to transform materials than can be obtained from the generation of new structures, it is better for the structures to remain unchanged. Irradiation is the catalyst which creates the initial beneficial change in the primer. Ideally at least one of the "X" groups is a halogen so that the latter can be preserved in any transformed structures.

Equation (3)—one of the "X" groups, is a methyl group ($CH_3$). It conforms to the preferred primer structure as having at least one hydrogen on an adjacent carbon atom of the main polymer unit. There is a good driving force for the generation of the free radical shown in equation (3). The free radical generated by irradiation is stabilized by the unsaturation which lowers the energy required to break the initial carbon to hydrogen bond.

Equation (4) shows the formaton of hydroperoxide which was exemplified in the parent application. It again can rupture very easily with heat or irradiation generating the free radicals in equation (5). RO is a halogen bearing radical which engrafts itself to the structure shown in equation (6). This particular engrafting reaction completes itself with the formation of water as a by-product shown in equation (7). The blocked off structure(s) in equation (6) shows how the primer could engraft onto the substrate. Ideally that structure would still bear a halogen (chlorine).

The primer portion of that engrated structure builds strength by cross-linking as shown in equations (8) and (9).

It is believed that this occurs because washing the irradiated primed surface with solvent did not alter the excellent adhesion results. There was virtually no residue from the "extraction" of the surface suggesting that the primer was cross-linked or resistant to solvent.

The engrafted, cross-linked primer is more strongly fastened to the substrate surface and it embodies halogen and peroxide and/or hydroperoxide groups.

In that (1) there are no weak boundary layers on the substrate (2) there are highly wettable chlroine sites in the primer for close intimate contact by one- or two-part adhesives and (3) the presence of peroxide or hydroperoxide makes the surface even more active for interaction with curatives in two-part adhesive for coating systems.

The extension of the inventive concepts to include primers other than chlorinated polypropylenes, albeit with the proper chemical structure as previously outlined, can make the system more economical while insuring durability. The latter is insured by the grafting reaction and also allows one to use virtually any adhesive, whether one or two-part. Other irradiative techniques have been much more restrictive in terms of what adhesives were used ie., it had to be a two-part. Some industries do not wish to use or do not have to use two-part adhesives because of added expense, possibility for operator errors, need for more inventory, mixing equipment, etc.

The invention is a durable, economical treatment system and the products produced thereby which is very accommodating to any one- or two-part adhesive that is applied.

EXAMPLE I

The Figure shows some results of increased adhesion with the disclosed technique when a polyisocyanate cured polyurethane adhesive was used as a vacuum forming adhesive for attaching vinyl to polypropylene. Preferred adhesives for bonding trim, molding or stripping to the irradiated paint coatings are polyurethane adhesives. Particularly preferred polyurethane adhesives are those produced by reacting an aliphatic or aromatic diisocyanate with polyester diols and short chain diol extenders. Especially preferred are polyurethanes comprising polymers provided by reacting methylene bis-(4-phenylisocyanate) with polyester diols and short chain diol extenders selected to provide adhesive products of desired performance characteristics such as elasticity, toughness, crystallinity, etc. The polyurethanes can be prepared by way of a one-step or two-step reaction. In the two-step reaction, the diol is first reacted with the diisocyanate to provide an intermediate which is chain extended with the short chain diol. The polyurethanes produced by way of a one or two-step reaction can be compounded as required with other ingredients such as plasticizers, fillers and other polymers, etc. to provide the desired adhesive compositions. These urethane adhesive compositions cure by reaction with a second component, generally a polyisocyanate, to provide flexible thermosetting characteristics. Preferred polyester diols used in providing methylene bis-(4phenylisocyanate) containing prepolymers are diols prepared from 1,4 butanediol adipates and/or 1,6-hexanediol adipates with typical molecular weights of the diols in the range of about 1500 to about 3000. Preferred short chain diols used for extending the methylene bis-(4-phenylisocyanate) containing prepolymers are 1,4-butane diol, ethylene glycol, diethylene glycol, etc. Preferred prepolymers are those having an isocyanate/polyester diol ratio in the range between about 1.5/1.0 to about 2.5/1.0 and ashort chain diol equivalent og 0.5 to 1.5. A slight excess of isocyanate is generally preferred above stoichiometry so the final isocyanate index is approximately 1.05.

Irradiation Dosage (Times Treated Beneath the Lamp)

X = A chlorinated polypropylene primer (Eastman's E-343-3 @25% solids in xylene) was applied to the polypropylene prior to irradiation.

O = A chlorinated polypropylene primer (Eastman's E-343-3 @5% solids in xylene/toluene) was applied to the polypropylene prior to irradiation.

The polyproylene was 350 mils thick.

Irradiation was conducted with a 18.5 inch medium pressure, high intensity mercury vapor lamp emmiting at 200 watts/linear inch (3700 watt lamp). Samples were placed 3–3½ inches beneath the light source on a conveyor belt travelling at a rate 14 feet/minute. Bond strength was determined as follows: 1×6" strips of polypropylene were sprayed with the two-part polyurethane adhesive previously described. The vinyl was heated to approximately 260° F. and applied to the dried, adhesive coated polypropylene and pressed together using 20–80 psi pressure. Bonds were pulled at 12"/minute using a Scott tester. The bonds were allowed to age for at least 24 hours prior to testing.

TABLE I

| Irradiation Dosage | Primer Concentration | Bond Strength[2]* 48 hrs. | Bond Strength[2] 48 hrs. |
|---|---|---|---|
| None (no primer) | — | — | — |
| None (primer only) | 25% | — | — |
| 1 × @ 14 ft/min. | " | — | — |
| 3 × @ 14 ft/min. | " | — | — |
| 6 × @ 14 ft/min. | " | — | — |
| 9 × @ 14 ft/min. | " | — | — |
| None (primer only) | 5% | 5.0 | 6.0 |
| 1 × @ 14 ft/min. | " | — | — |
| 3 × @ 14 ft/min. | " | — | — |
| 6 × @ 14 ft/min. | " | 17.0 | 22.0 |
| 9 × @ 14 ft/min. | " | — | — |

| Irradiation Dosage | Primer Concentration | Bond Strength[1] 72 hrs. | Bond Strength[2] 24 hrs. |
|---|---|---|---|
| None (no primer) | — | — | 0.0 |
| None (primer only) | 25% | — | 2.0 |
| 1 × @ 14 ft/min. | " | — | 6.0 |
| 3 × @ 14 ft/min. | " | — | 4.0 |
| 6 × @ 14 ft/min. | " | — | 10.0 |
| 9 × @ 14 ft/min. | " | — | 9.0 |
| None (primer only) | 5% | — | 4.0 |
| 1 × @ 14 ft/min. | " | — | 0.5 |
| 3 × @ 14 ft/min. | " | — | 0.5 |
| 6 × @ 14 ft/min. | " | 15.0 | 10.0 |
| 9 × @ 14 ft/min. | " | — | 7.5 |

*Results using Eastman's E-343-1 chlorinated polypropylene primer instead of E-343-3 concentration of E-343-1 = 5%.
[1]Higher temperature activating two-part polyurethane adhesive e.g. 160° F.
[2]Lower temperature activating two-part polyurethane adhesive e.g. 140° F.

The use of the primer alone is better, on average, without irradiation at low dosages, partionally at the 5% primer concentration. However, after exposure to the lamp 6 times, there is a dramatic increase in bond strength at both primer concentrations. Although there is a slight downward trend at exposures greater than 6 times, it still represents a dramatic increase of bond strength. The formation of desirable peroxides or hydroperoxides appear to be more prevalent at higher radiation dosages. The slight downward bond strength trend at even higher radiation dosages 9X) could be due to the breakdown, with light, of peroxides or hydroperoxides already formed.

The vacuum forming process is ideal for the current technique since the vinyl is heated to hi9h temperatures prior to the vacuum forming process. The heat from the vinyl breaks down the generated peroxides or hydroperoxides in the presence of the adhesive to provide a union between the primer and adhesive.

Epoxy adhesive systems are suitable. These are generally two-component mixtures such as Upaco s SW-471/SW-472. One component is made up of a bis-phenol A-type epoxy such as Shell 1001F or Interez s 520C. The other component is usually a low molcular weight polyamide such as Versamid 125. Both components can be modified with resins to make a product useful for vacuum forming such as low molecular weight polyurethanes, polyurethane modified epoxy oils, vinyl resins, etc.

Equally good results have been found when a solvent based, two-part epoxy adhesive was used as the vacuum forming adhesive. The two-part epoxy adhesive is composed of a solid bisphenol A-type epoxy plus a vinyl resin (Part A). The curative (Part C) is composed of a polyurethane compounded polyamide resin. The mix ratio of A/C is 2/1 yielding an adhesive whose solids is approximately 30%. The adhesive has excellent wettin characteristics. Bond values in excess of 20 lbs/in. have been found with the epoxy adhesive which resulted in a rupture of the vinyl fabric. We believe that the technique is applicable for all adhesive systems but particularly those containing chemical capable of reaction with free radical species. The adhesives can be solvent base, water base, hot melt or 100% solids liquid adhesives.

Particularly useful adhesives would be two-part urethanes (isocyanate cured), two-part polyesters (isocyanate cured), two-part epoxies (amine or polyamide cured), self-curing or two-part acrylic adhesives.

Polyesters useful for vacuum forming would be high molecular weight (20,000–50,000) and/or having a hydroxyl number in the 3–10 range. They would be made be esterification and polycondensation of mixtures of aromatic dibasic acids such as terephthalic/isophthalic acids, aliphatic dibasic acids such as terephthalic/isophthalic acids, aliphatic dibasic acids such as azelaic, sebacic, adipic acids and glycols such as ethylene glycol, 1-4 butane diol and 1,6-bexane diol. These type resins, as solvent solutions alone or in admixture with compounding ingredients and cured with a polyisocyanate would produce a useful vacuum forming adhesive. Base resins suitable for this purpose are supplied by Goodyear under the trademark of Vitel, e.g. Vitel 307. Polyisocyanate curatives useful with polyesters would be Upaco s 3305.

Acrylic adhesives suitable are reactive acrylics such as XA-5102 from Polyvinyl Chemical or other similar types of reactive acrylics from other suppliers. These can be cured with Polyvinyl s WD-510. The latter is a water dispersed epoxy resin to go with the water base reactive acrylic resin. Such blends can also be compounded with water base polyurethanes such as Upaco s WX-480.

Primers containing chlorine are particularly useful in our process because of the ease with which a carbon/chlorine bond can be broken with light. Chlorinated polypropylene primers are most useful in improving the adhesion to EPDM products which are ethylene/propyene terpolymers. Although the chlorinated primers are particularly useful for reasons previously cited, any primers which can generate peroxide or hydroperoxide groups upon subsequent irradiation are useful. Those which cannot form free radicals easily to form peroxide or hydroperoxides could be catalyzed with the assistance of photosensitizers which can be incorporated directly into the primer.

Suitable sources of activating radiation may be used but ultraviolet radiation is definitely preferred. Particularly suitable ultraviolet radiation is radiation at a wave length of from about 2000 to about 2800 A. Suitable ultraviolet radiation dosages are between 0.01–1.0 Joules/cm$^2$ when measured at 3650 A and preferably between about 0.1 to about 0.2 Joules/cm$^2$. The primer may be irradiated continuously over a preselected period of time or irradiated continually for incremental periods of a preselected time. For example, the primer may be subjected to four irradiations of about 20 seconds each. Irradiation for incremental periods of time minimizes thermal build-up during irradiation and can be employed if thermal build-up should be a consideration of importance. Ultraviolet irradiation suitable for the practice of the invention has been obtained using commercially available 18.5 inch, high intensity medium pressure mercury vapor lamps which operate at about 200 watts/linear inch.

In an alternative embodiment of the invention, the primer may be irradiated in the presence of a radiation photosensitizer. Ultraviolet radiation photosensitizers increase the effectiveness of the ultraviolet radiation and suitable photosensitizers include materials such as benzophenone, fluorene, anthrone, para-chlorobenzophenone, benzil and other known photosensitizers or mixtures of sensitizers, e.g. benzophenone and benzil or benzophenone and anthrone, etc. Considerations involved in selecting a suitable photosensitizer include such factors as solubility in the solvents suitable for the primer, cost, effectiveness at creating beneficial changes and availability.

Any manner for integrating the photosensitizer with the primer for irradiation can be employed so long as sufficient photosensitizer will be present to increase the effectiveness of the irradiation. Generally, the photosensitizer is applied to the primer in the form of a solution in a volatile solvent in the case of a solid photosensitizer or as a pure or diluted solution in the case of liquid photosensitizer. Methylene chloride is a particularly preferred solvent or diluent. The solution may be sprayed, wiped or otherwise applied to the primer and most commonly the amount of photosensitizer in the solution is about 0.5 to about 15% by weight and preferably about 1 to about 5% weight. Alternatively, the photsensitizer can be included in the primer and the primer sensitizer mixture applied to the substrate.

Example II

A primer was made by diluting Eastman s E-343-3 primer down to 1.0% solids with toluene. The primer solution was coated on (a) polypropylene and (b) an elastomer modified polypropylene (called TPO: Thermo Plastic Olefin). The primed samples were exposed to a medium pressure, high intensity mercury vapor lamp, emitting wattage at 200 watts per linear inch. The samples were exposed to an 18.5 inch lamp by passing them perpendicular to the lamp on a conveyor belt travelling at 14 ft/minute and at a distance of 3-4 inches from the lamp. The samples were passed 6X beneath the lamp which amounted to a stationary exposure of 2.2 seconds.

The treated samples were coated with (a) commercial neoprene, Upaco s 1291; (b) polyurethane, Upaco s 2400; and (c) polyurethane, Upaco s 2400; plus a polyisocyanate, Upaco s 3305 mixed in a 20:1 ratio by weight.

Vinyl samples were coated with the same adhesives. The coated polyolefin or TPO, Substrate I, and vinyl, Substrate II, samples were dried for 1 hour at room temperature and then heated to approximately 130° F. during 30 seconds and bonded in a press with 80 pounds of pressure. The bonds were aged for 24 hours and yielded the following results:

| SUBSTRATE 1 | SUBSTRATE 2 | ADHESIVE | TREATMENT | BOND | FAILURE |
|---|---|---|---|---|---|
| Polypropylene | Vinyl | Neoprene | None | 0 | Strip from PP |
| Polypropylene | Vinyl | Polyurethane | None | 0 | Strip from PP |
| Polypropylene | Vinyl | Polyurethane/Polyisocyanate | None | 1 | Strip from PP |
| Polypropylene | Vinyl | Neoprene | Primer Only | 1 | Strip from PP |
| Polypropylene | Vinyl | Polyurethane | Primer Only | 1 | Strip from PP |
| Polypropylene | Vinyl | Polyurethane/Polyisocyanate | Primer Only | 2 | Strip from PP |
| Polypropylene | Vinyl | Neoprene | Primer + U.V. | 21 | Vinyl tear |
| Polypropylene | Vinyl | Polyurethane | Primer + U.V. | 21 | Vinyl tear |
| Polypropylene | Vinyl | Polyurethane/Polyisocyanate | Primer + U.V. | 21 | Vinyl tear |
| TPO | Vinyl | Neoprene | None | 1-2 | Strips from TPO |
| TPO | Vinyl | Polyurethane | None | 1-2 | Strips from TPO |
| TPO | Vinyl | Polyurethane/Polyisocyanate | None | 2 | Strips from TPO |
| TPO | Vinyl | Neoprene | Primer only | 4 | Strips from TPO |
| TPO | Vinyl | Polyurethane | Primer only | 4 | Strips from TPO |
| TPO | Vinyl | Polyurethane/Polyisocyanate | Primer only | 4-5 | Strips from TPO |
| TPO | Vinyl | Neoprene | Primer + U.V. | 21 | Vinyl tear |
| TPO | Vinyl | Polyurethane | Primer + U.V. | 21 | Vinyl tear |
| TPO | Vinyl | Polyurethane/Polyisocyanate | Primer + U.V. | 21 | Vinyl tear |

Example III

Several primers were prepared at 1% concentration by dissolving the following materials in toluene:

| MATERIAL | CHEMICAL TYPE | SUPPLIER |
|---|---|---|
| E-343-3 | Chlorinated Polypropylene | Eastman |
| E-343-1 | " | " |
| E-153-2 | Chlorinated Polyethylene | " |
| VMCH | Vinyl chloride/Vinyl acetate | Union Carbide |
| VMCC | Maleic Acid Terpolymer | " |
| VMCA | " | " |
| VYHH | Vinyl/Chloride/Vinyl Acetate Copolymer | " |
| ACL-90 | Trichloroisocyanuric Acid | Monsanto |
| ALLOPRENE | Chlorinated SBR | ICI |
| PARLON | " | Hercules |

The above primers were evaluated by coating them onto polypropylene and exposing the coated samples to U.V. for 2.2 seconds. The exposure was actually done by passing the samples 6X beneath the lamp on a conveyor travelling at 14 ft/minute at a distance of 3-4 inches from the lamp. The lamp is 18.5 inches in length and emits at 200 watts/linear inch; it is a medium pressure, high intensity mercury vapor lamp. The treated polypropylene samples were coated with a water base polyurethane Upaco s WX-480 containing a water dispersible isocyanate Upaco s WX-490, mixed in a 20:1 ratio by weight. Vinyl was bonded to the adhesive coated polypropylene samples by heating the vinyl to about 240° F. or higher and pressing it to the coated polypropylene in a press with 80 pounds of pressure. This type of evaluation would be similar to that used for vacuum forming of automotive door panels.

| PRIMER | BOND VALUE | TYPE OF FAILURE |
|---|---|---|
| E-343-3 | 23 | Vinyl tear |
| E-343-1 | 20 | " |
| E-153-2 | 2 | Strips from PP |
| VMCH | 20 | Vinyl tear |
| VMCC | 10-12 | Strips from PP/Some vinyl tear |
| VMCA | 5 | Strips from PP |
| VYHH | 8-10 | " |
| ACL-90 | 2 | " |
| Alloprene | 2 | " |
| Parlon | 2 | " |

Example IV

The process is applicable to polyolefin foams as well as solid polyolefin surfaces. The process produces excellent results on foam and further lower radiation dosages are generally required for foams than solid substrates. The lower strength of the foam may have something to do with the lower required dosage to create a beneficial change.

Several polyolefin foams were treated and bonded to vinyl using a thermoplastic polyurethane adhesive. The foams were primed with a 1% solution of Eastman s E-343-3 reduced with toluene. Subsequently they were irradiated for varying time periods beneath the lamp which is mounted to a stationary radiation time period of approximately 0.4 aseconds to 3.9 seconds. This was a distance of 3-4 inches from a 3700 watt lamp (18.5 inches) on a conveyor travelling at 14 ft/minute. The light source was again a medium pressure, high intensity mercury vapor lamp emitting at 200 watts/linear inch. The primed and irradiated foams and the vinyl were coated with a one-part polyurethane adhesive Upaco s 2406 and allowed to dry for one (1) hour. The substrates were then activated at 130° F. during 30 seconds and pressed in a press set at 80 pounds pressure.

The bond results are summarized below:

| TYPE OF FOAM | TREATMENT | BOND VALUE (llbs/inch) | TYPE OF FAILURE |
|---|---|---|---|
| Polypropylene | None | 0 | Strips from PP |
| Polypropylene | Prime only | 0 | " |
| " | (a) Prime (b) Irradiate 1X | 5 | Polypropylene Foam tear |
| " | (a) Prime (b) Irradiate 2X | 5 | " |
| " | (a) Prime (b) Irradiate 3X | 5 | " |
| " | (a) Prime (b) Irradiate 5X | 5 | " |
| " | (a) Prime (b) Irradiate 6X | 5 | " |
| " | (a) Prime (b) Irradiate 7X | 5 | " |
| " | (a) Prime (b) Irradiate 9X | 5 | " |
| " | (a) Prime (b) Irradiate 11X | 5 | " |
| Cross-linked Polyethylene (Type I) | None | 0 | Strips from PE |
| " | Prime only | 0 | " |
| " | (a) Prime (b) Irradiate 1X | 5-6 | PE Foam Tear |
| " | (a) Prime (b) Irradiate 2X | 5-6 | " |
| " | (a) Prime (b) Irradiate 3X | 5-6 | " |
| " | (a) Prime (b) Irradiate 4X | 5-6 | " |
| " | (a) Prime (b) Irradiate 5X | 5-6 | " |
| " | (a) Prime (b) Irradiate 6X | 5-6 | " |
| Cross-linked Polyethylene (Type II) | None | 0 | Strips from PE |
| " | Prime Only | 1 | Shallow Foam Tear |
| " | (a) Prime (b) Irradiate 1X | 2-3 | Deep Foam Tear |
| " | (a) Prime (b) Irradiate 2X | 2-3 | " |
| " | (a) Prime (b) Irradiate 3X | 2-3 | " |
| " | (a) Prime (b) Irradiate 5X | 2-3 | " |
| " | (a) Prime (b) Irradiate 6X | 2-3 | " |
| " | (a) Prime (b) Irradiate 7X | 2-3 | " |
| " | (a) Prime (b) Irradiate 9X | 2-3 | " |
| " | (a) Prime (b) Irradiate 11X | 2-3 | " |

It is believed that subjecting the primer to several separate relatively low level exposures or dosages of radiation rather than exposure to a relatively high level exposure or dosage plays a significant part in the bonding process. That is, exposing the primer to radiation a plurality of times, say for example 6X, at a value of 0.2 Joules/cm$^2$, produces a far superior bond than exposing the primer to radiation one or more times, say for example 1X at a value of 1.2 Joules/cm$^2$ (the cumulative value at 6X). It may be the successive exposures are necessary to effect the reactions developed in the chart. In tests conducted, a primer exposed 6X to relatively low level ultraviolet light had approximately twice the bonding strength when the same primer was exposed a single time to ultraviolet radiation having a value equal to the total exposure at 6X. The laminate was polypropylene, the primer was chlorinated polypropylene (Eastman s E-343-3 at 1% solids in xylene) and the adhesive was polyisocynate and polyurethane.

This substrate vinyl has been used to illustrate the bond enhanced between the primer and adhesive and between the polyolefin and the primer. Any substrate combatable with the adhesive system may be used to demonstrate the bondin9 properties of the treated primer.

Having described my invention, what I now claim is:
1. A method for bonding of a coating to a polyolefin surface which includes:
    coating the surface with a halogenated polyolefin primer of the structure:

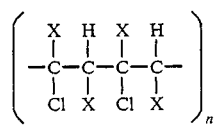

where X=selected from the group consisting of chloro, and bromo, fluoro; straight chained hydrocarbons, selected from the group consisting of Methyl, Ethyl, and Propyl Acid;
treating the primer to form free radical species; and
applying a coating to the primer to effect chemical bonding between the species and the coating.

2. The method of claim 1 wherein the surface structure is:

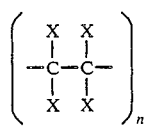

where X=selected from the group consisting of chloro, bromo, and fluoro; straight chained hydrocarbons, selected from the group consisting of Methyl, Ethyl, and Propyl, Maleic Acid.

3. The method of claims 1 or 2 wherein the surface is a foamed surface.

4. A polyolefin laminate which comprises a substrate of polyolefin, a halogenated polyolefin primer bonded to the polyolefin substrate, said primer having the structure:

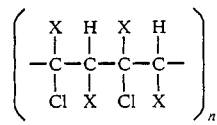

where X=selected from the group consisting of chloro, bromo, and fluoro; straight chained hydrocarbons, selected from the group consisting of Methyl, Ethyl, and Propyl; Maleic Acid, the primer characterized by free radical species which are adapted to chemically react with a coating applied thereto to form an adhesive bond between the coating and the primer.

5. The laminate of claim 4 wherein the polyolefin surface has the structure:

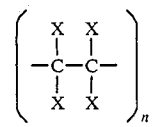

where X=selected from the group consisting of chloro, bromo, fluoro; straight chained hydrocarbons, selected from the group consisting of Methyl, Ethyl, and Propyl; Maleic Acid, the primer characterized by free radical species which are adapted to chemically react with a coating applied thereto to form an adhesive bond between the coating and the primer.

* * * * *